April 7, 1931.  D. E. GOMMEL  1,799,623
SWAGE SHAPER
Filed Oct. 28, 1927
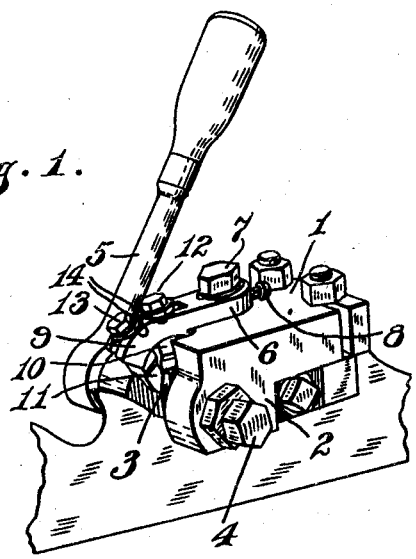
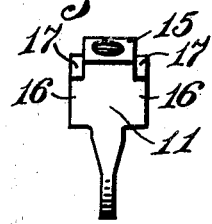
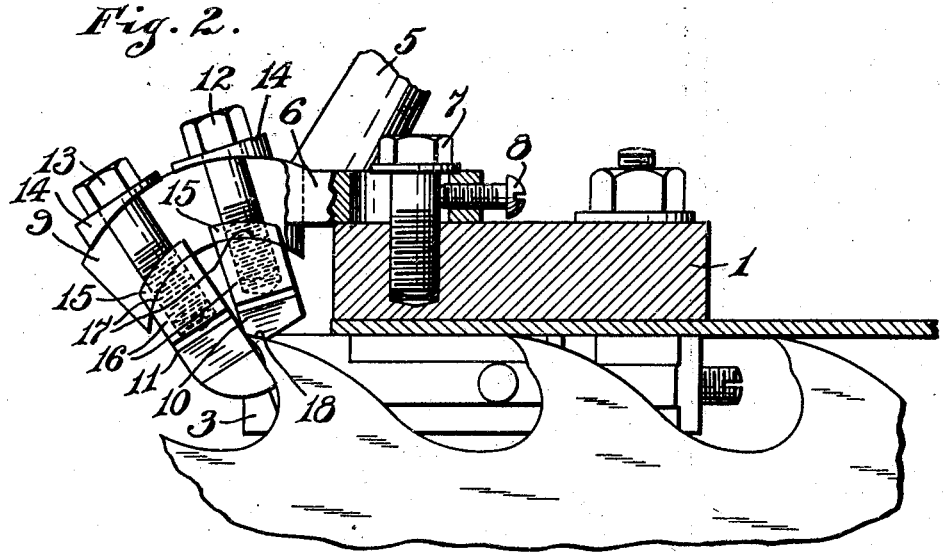
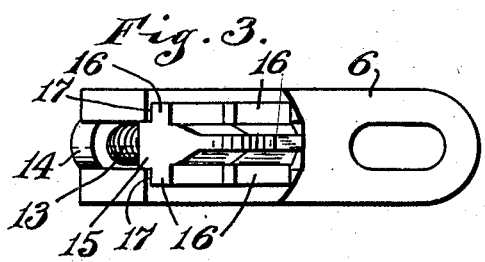
INVENTOR
Dewey E. Gommel,
BY
Hood & Hahn
ATTORNEYS Patented Apr. 7, 1931                                                               1,799,623

UNITED STATES PATENT OFFICE

DEWEY E. GOMMEL, OF INDIANAPOLIS, INDIANA, ASSIGNOR TO E. C. ATKINS & COMPANY, OF INDIANAPOLIS, INDIANA, A CORPORATION OF INDIANA

SWAGE SHAPER

Application filed October 28, 1927. Serial No. 229,330.

My invention relates to swage shapers and it is one of the objects of my invention to provide an improved form of tooth gage for swage shapers which will co-operate with the shaper jaws in such a manner as to improve the form of saw tooth produced by the shaper.

For the purpose of disclosing my invention I have illustrated one embodiment thereof in the accompanying drawings in which, Fig. 1 is a perspective view of a shaper embodying my invention;

Fig. 2 is a longitudinal sectional view of the shaper showing the tooth gage in side elevation and partly in section;

Fig. 3 is a bottom plan partly in section of the tooth gage;

Fig. 4 is an end elevation of one of the tooth gage members.

The shaper may be of the type disclosed in the patent to Pribnow, No. 463,547, dated November 17, 1891, or may take any other desired form and comprises in general a main body 1 having portions 2 adapted to straddle the saw and each carrying a shaper jaw 3 swingably mounted at its rear end. The front end of one jaw is adapted to be positioned relatively to the side of the saw tooth point by means of a set bolt 4 and the front end of the opposite jaw is swung toward this jaw by means of a handle 5 operating a screw engaging the front end of the jaw.

A tooth gage is mounted at the forward end of the body 1 and comprises a holder having a rearward extension 6 slotted to receive the holding bolt 7 which passes through the slot and takes into the body 1. A set screw 8 extends through the rear end of the extension and bears against the bolt 7 to permit of adjustment of the holder forwardly and back relatively to the base. The forward extension 9 of the holder is adapted to support the gage members 10 and 11 and is curved on a circle having its center on the point of the saw tooth. This holder 9 is slotted to receive the bolts 12 and 13 for the gage members 10 and 11, and said bolts extend through the slot and take into the tops of the gage members, washers 14 having curved bottom faces corresponding to the curvature of the holder member 9 being interposed between the heads of the bolts and the top of the holder. The tops 15 of the gage members fit within the slot and below this point the gage members are widened as at 16 to form shoulders 17 curved on their upper faces to correspond to the curvature of the holder. These shoulders bear against the bottom of the holder so that when the clamping bolts 12 and 13 are set up the gage members are securely clamped in position. The bottom face of the gage member 10 is beveled off as at 18 to accurately fit on the top of the point of the saw tooth and the gage member 11 is sufficiently long to extend down the front edge of the saw tooth to a point where the curvature of the gullet of the tooth commences and beyond the swedge of the saw.

In operation the gage members 10 and 11 are adjusted on the gage holder so that the front edge of the member 10 is practically in contact with the adjacent edge of the member 11 forming an angle intersection or crotch into which the point of the tooth is adapted to fit with the gage member 10 bearing on the back of the tooth at the point and the gage member 11 bearing on the front edge of the tooth and extending along the face of the tooth below the swedge thereof. After this adjustment has been completed the handle 5 is operated to close the shaper jaws on the sides of the tooth in the usual manner and due to the fact that the gage member engages the tooth below the swage, the metal during the shaping operation, may flow forwardly, thus avoiding the loss of metal which would occur in the types of tooth gages heretofore used. With the metal flowing forward in the swedge it is not necessary to grind back so far for sharpening purposes.

A major advantage of the arrangement herein disclosed lies in the manner in which the tool can be operated to restore a broken or a seriously worn tooth. As has been stated, the extension 9 is formed as the arc of a circle having its center located at the extreme point of a tooth of desired shape. No matter to what adjusted positions the gage members 10 and 11 are moved, the crotch formed by the two members in engagement is not moved. As has been indicated, in use, the gage member 11 is located by being moved to a position where its one face lies in contact with that portion of the tooth between the lower end of the swage and the upper end of the gullet, such portion lying, of course, in a straight line. This engagement, of course, definitely locates the proper position of the member 11, and it will be noted that this positioning of the member 11 is in no way affected by that portion of the tooth which has been subject to the wear and attrition of sawing. Thus it will be obvious that, even if an end portion of the tooth in question has been entirely worn or broken away, the member 11 may be properly located with absolute facility. The member 11 having been positioned, the member 10 is moved into contact with said member 11. It is here to be noted that the optimum position for the member 10 is determined not by the saw tooth, but by the member 11. Because of the shape of the extension 9, and because of the individual adjustability of the members 10 and 11, it is thus possible to locate said two members in such a manner as to form a crotch, the apex of which will be properly located, even though the point of the tooth is entirely gone. The members 10 and 11 having been thus positioned, the action of the swage blocks causes the metal of the tooth to flow up into the crotch, restoring the tooth to its proper shape.

I claim as my invention:

1. The combination with a swage shaper, of a tooth gage carried thereby and including a gage member of such length as to engage the tooth to be swaged below the swedge thereof, and adjustable to present its tooth engaging face at different angles relatively to the face of the tooth.

2. The combination with a swage shaper, of a tooth gage carried thereby and of such length as to engage the face of the tooth to be swaged substantially at the beginning of the gullet of the tooth and adjustable to present its tooth engaging face at different angles relatively to the face of the tooth.

3. The combination with a swage shaper, of a tooth gage carried thereby, said gage being adjustable on a circle having its center on a point adapted to coincide with the point of the tooth of the saw and engaging the front edge of the tooth at a point beyond the swage in said tooth.

4. The combination with a swage shaper, of a tooth gage including a gage member adapted to engage the back of the point of the tooth to be swaged, and a second member of such length as to engage the front edge of the tooth at a point substantially at the beginning of the tooth gullet, said members being independently adjustable relative to the tooth.

5. The combination with a swage shaper, of a tooth gage including a member engaging the front edge of the tooth and extending to a point beyond the swedge of the tooth, said member being adjustable on the arc of a circle having its center on a point adapted to coincide with the point of the tooth.

6. The combination with a swage shaper, of a tooth gage comprising a pair of gaging members, one arranged to engage the back of the saw tooth at its point and the other to engage the face of the saw tooth and extend to a point beyond the swedge of the tooth, said members each being independently adjustable on a circle having its center at a point adapted to coincide with the point of the saw tooth.

7. The combination with a swage shaper, of a tooth gage comprising a body and a pair of gaging members mounted thereon, one of said members being arranged to engage the back of the saw tooth at its point and the other to engage the face of the saw tooth at a point beyond the swage of the tooth, each of said members being angularly adjustable with respect to said body.

8. The combination with a swage shaper, of a tooth gage carried thereby and including an engaging member for the back of the tooth and an engaging member for the front of the tooth, each of said members being relatively angularly adjustable to the other.

9. The combination with a swage shaper, of a tooth gage carried thereby, including a gaging member adapted to engage the back of the tooth and a second member engaging the front of the tooth and of sufficient length to extend below the swage in said tooth and adjustable to present its tooth engaging face at different angles relatively to the face of the tooth.

10. The combination with a swage shaper, of a tooth gage carried thereby and including an engaging member for the back of the tooth, and a member adapted to engage the face of the tooth substantially at the beginning of the gullet thereof, and adjustable to present its tooth engaging face at different angles relatively to the face of the tooth.

11. The combination with a swage shaper, of a tooth gage carried thereby and comprising a pair of gage members adapted to form a crotch therebetween and to receive in said crotch the point of a tooth of a saw and means supporting said gage members, said gage members being adjustable on said means without varying the position of the apex of said crotch, which position is at an optimum distance from the center of said saw.

12. The combination with a swage shaper, of a tooth gage comprising an arcuate projection, a gage member adjustably mounted on said projection and having a length sufficient to engage the tooth to be swaged below the swage thereof, and a second gage member adjustably mounted on said projection and adapted to engage said first gage member to form therewith a tooth-receiving crotch.

13. The combination with a swage shaper, of a tooth gage comprising an arcuate projection, a gage member adjustably mounted on said projection and having a length sufficient to engage the tooth to be swaged below the swage thereof, and a second gage member adjustably mounted on said projection and adapted to engage said first gage member to form therewith a tooth-receiving crotch, the center of curvature of said projection being located at the apex of said crotch.

In witness whereof, I, DEWEY E. GOMMEL, have hereunto set my hand at Indianapolis, Indiana, this 24th day of October, A. D. one thousand nine hundred and twenty-seven.

DEWEY E. GOMMEL.

CERTIFICATE OF CORRECTION.

Patent No. 1,799,623. Granted April 7, 1931, to

DEWEY E. GOMMEL.

It is hereby certified that error appears in the printed specification of the above numbered patent requiring correction as follows: Page 1, line 82, for the word "swage" read swedge; page 2, lines 3, 53, 86, 100 and 128, for "swage" read swedge; same page, line 116, after "saw" insert a comma; page 3, line 8, for "swage" read swedge; and that the said Letters Patent should be read with these corrections therein that the same may conform to the record of the case in the Patent Office.

Signed and sealed this 26th day of May, A. D. 1931.

(Seal)

M. J. Moore,
Acting Commissioner of Patents.